Patented Oct. 17, 1950

2,526,111

UNITED STATES PATENT OFFICE 2,526,111

PRODUCTION OF WHITE SUGAR FROM COLORED SUGAR BEARING FLUIDS WITHOUT MOLASSES AS A BY-PRODUCT

John Paul Bartz, Fort Lauderdale, Fla.

No Drawing. Application April 19, 1949, Serial No. 88,492

23 Claims. (Cl. 99—141)

This invention relates generally to the manufacture of white sugar from colored sugar bearing fluids and juices without molasses as a by-product. It relates more particularly to sugar compositions in crystalline, powdered or solid form which have superior sweetening and improved nutritional properties, with reduced fattening qualities and greater sugar tolerance than heretofore known. It very specifically relates to a new process for preparing and producing water white liquid sugar and syrup from colored sugar bearing fluids and juices such as sugar cane juice, sugar beet juice, citrus fruit juice, sugar solutions of raw brown sugar, sugar solutions obtained from the hydrolysis or enzymatic splitting of starch and starch products and the like.

It is well known and recognized that sugar bearing fluids obtained in commercial operations from juices of plants, root crops, hydrolysis of starch and starch by products, maple juice, citrus fruit juices etc. are rich in all or part of the nonsugar solids such as coloring matter, gums, dextrins, organic acids, glucosides, vitamins, proteins and mineral salts. One per cent of sodium or potassium chloride will hold as much as five per cent sugar and especially sucrose in solution and prevent it from crystallizing. In the processes now in use in the sucrose industry the concentrated sucrose solutions often contain as much as four to seven per cent of sodium and potassium chloride. As a result the molasses residue contains or retains 30–35 per cent of sucrose. In the sugar beet operation the final molasses contains as much as 50 per cent. In the corn sugar industry the final corn feeding molasses contains approximately 50 per cent glucose or dextrose. Furthermore, in the processes now in use in the sucrose industry none of the glucose or dextrose and levulose of the sugar cane juice is recovered for human use. The processes also require two operations before the sucrose, the table sugar of commerce is available to the consumer, namely the production of raw sugar and the refining of the raw sugar. In this last operation more molasses is formed and more sugar is lost. In normal times final molasses is practically worthless.

It is obvious if one could remove all of the sugar, that is, sucrose, glucose, levulose or maltose, or a mixture of these sugars from the sugar-bearing fluids and juices, in one operation, the efficiency, revenue and usefulness of the entire sugar operation would be enhanced. In normal times it may mean the difference between profit and loss in the sugar operation. Heretofore, this has not been done.

Again, water white liquid sugar has not been produced heretofore successfully from colored sucrose bearing fluids so as to warrant this product as an article of commerce. There are several reasons for this, (1) present sucrose manufacturing processes are not adaptable for making water white liquid sugar. The sucrose industry has directed its efforts toward producing only sucrose in the crystalline form and the working processes have been developed with this in mind, (2) the sucrose industry does not have a process for making water white liquid sugar from the juice, (3) the juice contains coloring matter which is expensive and difficult to remove.

Sugar cane juices, as produced under commercial conditions contain highly colored compounds and resinous material such as chlorophyll, saccharetin, anthocyanin, xanthophyll, riboflavin and other similar compounds and pigments. The slightest undetectable trace of saccharetin in the "apparently water white" dilute liquid sugar upon higher concentration required for commercial adaptability will produce a brown color. Chlorophyll and other pigments in the presence of hydroxyl ions will likewise produce a bluish black color. In some instances, the coloring matter in the juice has been temporarily removed by chemical bleaching compounds such as chlorine gas, sulphur dioxide gas, sodium chlorite in acid medium, persulphates, percarbonates, peroxides and the like. While with the use of certain bleaching compounds the color of the dilute sugar solution is satisfactory, it has been found that some of the pigments are reversibly oxidized and reduced. Upon concentration the color is again restored. In other instances, new compounds are formed by the treatment which are bitter, some are toxic. In all instances, the nonsugar solids have been increased by this treatment and quality of the finished product of an inferior grade or undesirable (4) sugar cane juices, sugar beet juices, solutions of unrefined raw sugar, etc., contain nonsugar solids which, when present in liquid sugar or syrup, are objectionable to the trade. Among these nonsugar solids are substances such as gums which impart molasses like flavors to the finished product, protein bodies, amino acids, amides, bitter glucosides, organic acids such as aconitic, succinic, glycolic, malic, etc., mineral salts such as potassium, sodium, calcium, magnesium, iron, etc. (chlorides, phosphates, carbonates, sulphates). Unless the nonsugar solids including a significant amount of the mineral salts are removed prior to the concentration of the dilute solution the finished product will contain from 10 to 25 per cent of objectionable nonsugar solids. This material imparts a bitter and salty taste to the sugar sweetening agent and will give it properties undesirable for use in beverages, foods, fruit products and for table use.

Heretofore, the corn industry has not made a liquid sugar but has confined its efforts to corn syrup, dextrose and Cerelose. Corn syrup contains as much as 40 per cent dextrins and seldom less than 4 per cent. Dextrose in corn syrup is only about one third as sweet as levulose while maltose is only one sixth as sweet. Dextrose is only three fourths as sweet as sucrose and maltose is only one third as sweet. The dextrins in corn syrup have little sweetening properties. In the manufacture of dextrose and corn syrup large amounts of corn molasses is formed as a by-product.

This invention contemplates that sugar bearing fluids and juices be treated by chemical means and ion exchange treatment in a new and novel manner wherein the salts present in the sugar bearing fluids which form insoluble compounds readily be removed by chemical treatment, the excess of undesirable gums, pectins, dextrins and proteins removed by a protein and alkoidal precipitant, a portion or all of the coloring matter removed by activated charcoal or bone char or both, and the remaining reagents introduced and undesirable and toxic elements which are present in minute amounts, together with the chlorides of potassium and sodium be removed by ion exchange. The aqueous sugar solution is then concentrated into crystalline or powdered sugar or liquid sugar as desired. There is no molasses formed in this process and the yields of sucrose, or dextrose or a mixture of sucrose, dextrose and levulose in crystalline or powdered or liquid state are increased materially. All of the undesirable nonsugar solids which are easily precipitated are removed while these desirable nonsugar solids which are retained varies in amount from ten micrograms to 7 grams per 100 grams of crystalline or powdered or liquid sugar.

The desirable nonsugar solids includes such substances as vitamin $B_1$ or thiamin, biotin, pyridoxin, choline, niacin, ascorbic acid, riboflavin, pantothenic acid, vitamin $B_{12}$, Inositol and other vitamins, together with fat soluble vitamin E and K in sugar bearing fluids such as sugar cane juice, etc. It may also contain traces of mineral matter such as iron, copper, manganese, zinc, and iodine. This invention further contemplates that desirable nonsugar solids which are not present in the finished liquid sugar, or syrup or in the crystalline or powdered sugar composition may be added to same in amounts not to exceed 7 grams per 100 grams of sugar or liquid sugar. The desirable nonsugar solids may be dissolved in convenient solvent or added in the crystalline or powdered form as desired.

This invention further contemplates that highly refined sugar or liquid sugar or syrup may be produced from colored raw sugar which contains small amounts of molasses as impurities by employing chemical and ion exchange treatment in a new, novel and improved manner.

By syrup is meant a sweetening material which may contain one or more sugars and shall not contain more than 30 per cent water nor more than 2.5 per cent ash constituents and not less than 70 per cent solids. A mixture of mono and di saccharide sugars is to be preferred, that is, sucrose, glucose and maltose, and dextrin in small amounts, or sucrose and levulose, or glucose sucrose and dextrin in small amounts, or sucrose, glucose and levulose.

By liquid sugar is meant a sweetening material which has a specific rotation of a plus 90 to a minus 88 degrees. It may contain one or more sugars, but a mixture of mono and di saccharide sugars are to be preferred. The total nonsugar solids shall not exceed 7 grams per 100 grams of liquid sugar. Highly refined liquid sugar shall be free of all nonsugar solids but a trace, that is, ten micrograms per 100 grams of liquid sugar. All other liquid sugars shall contain from ten micrograms to 7 grams of nonsugar solids per 100 grams of liquid sugar. The latter product may be colored or water white as desired. The Brix shall range from 59 to 90 degrees when measured at 20° C. A Brix of 69 to 90 degrees is to be preferred. Liquid sugar shall have a pH range from 4.5 to 9.0 but a pH of 5.2 to 7.2 is to be preferred. The preferred specific rotation is from a plus 62 to a minus 19 degrees when measured at 20° C. It is to be understood that powdered and crystalline sugar composition, as well as liquid sugars and syrups are adaptable for human use or consumption, table use, beverages, food products, confectioneries, jellies, alcohol production and the like.

It is to be pointed out that liquid sugar prepared in accordance with this invention should not be confused with the corn syrup of commerce. Corn syrup may contain as much as 40 per cent dextrin. This material has poor sweetening properties. Corn syrup also contains more than 7 per cent nonsugar solids which is the top limit for liquid sugar. It does not contain water soluble vitamins nor the valuable trace elements of iron, zinc, cobalt, copper, manganese, iodine and phosphorus as found in certain liquid sugars prepared by this process. Liquid sugar prepared in accordance with this invention shall not be confused with refiners' syrup, or with the old fashioned cane molasses or syrup made by the evaporation of the juice of sugar cane without the removal of any sucrose or without the removal of any of the undesirable nonsugar solids. Such a syrup contains from 10 to 25 per cent of objectionable nonsugar solids and from 2.5 to 8 per cent ash constituents. These products are highly colored and have a distinct molasses taste. Further, this product is not marketable under all conditions as sucrose will separate out when exposed to cold temperatures. Therefore, the reason why a mixture of sucrose with other sugars in liquid sugar is preferred to sucrose alone.

This invention is a continuation-in-part of my application Serial No. 705,805 which relates to the production of liquid sugar by chemical treatment without ion exchange. I have discovered that by using the ion exchange method to remove only the soluble chlorides, potassium and sodium and trace elements instead of all the ash constituents from sugar bearing fluids, in combination with chemical treatment, a very efficient process has been developed. The chloride ions cannot be removed by chemical treatment except by the expensive and prohibitive silver nitrate method and this is not practical. This invention is also a continuation-in-part of my application Serial No. 769,004.

One object of the present invention, generally stated, is to provide a new process which is more economical and efficient for the production of mono and di saccharide sugars, sucrose or dextrose in crystalline and powdered form from colored sugar bearing fluids in one continuous operation, by ion exchange and chemical treatment.

A further object of this invention is to prepare sugar composition in solid state having superior food properties with reduced fattening qualities and having greater sugar tolerance.

Another object of this invention is to provide a process for the manufacture of water white sugar and syrup from colored sugar bearing fluids in one continuous operation without any molasses as a byproduct by ion exchange and chemical treatment.

A particular object of the present invention is to provide a new, novel, and improved method for the refining of raw sucrose, or dextrose by ion exchange and chemical treatment.

A special object of this invention is to provide a process for the manufacture and production of liquid sugar and syrup from colored sugar bearing fluids in one continuous operation whereby more total sugars are recovered for human consumption than obtained heretofore by other processes.

A very special object of this invention is to provide a process and method for preparing a colorless liquid sugar and syrup from colored sucrose bearing fluids rich in nonsugar solids by the employment of chemical treatment and ion exchange in such a manner that the objectionable nonsugar solids are removed and the desirable nonsugar solids retained so that the finished product in the concentrated state is a highly nutritious food product, free of molasses flavors, undesirable organic matter, mineral salts and contains from ten micrograms to 7 grams of valuable nonsugar solid matter per 100 grams of sugar.

Other objects of this invention will become apparent to those skilled in the art as the subject matter is disclosed.

In accordance with this invention sucrose and mono-saccharide sugars may be made and produced separately or collectively in a liquid, solid or crystalline state from any colored sugar bearing fluid such as sugar cane juice, sugar fluids from starch, sugar beet juice, unrefined raw sugar dissolved in aqueous medium, citrus juices by removing the nonsugar solids by employing chemical treatment and ion exchange in a new and improved manner and concentrating the resulting aqueous sugar solution so that a liquid, solid or crystalline sugar product results.

Heretofore, the employment of either the chemical treatment or ion exchange as the sole method for removing objectionable nonsugar solids from sugar cane juices, sugar beet juices, solutions of unrefined raw sugar has not proven to be entirely satisfactory. However, I have discovered that if the gums, proteins, glucosides, organic matter, and a portion of mineral salts are first removed by chemical treatment, ion exchange is very satisfactory for the removal of trace elements. In so much as the regeneration of the resins by alkali and acid is logarithmetically proportional to the amount of elements removed, this step becomes a very important phase of successful processing of colored sucrose bearing fluids.

By ion exchange is meant the exchange of hydrogen ions from the resinous product for cations in the sugar bearing fluid which has been allowed to flow through a column of resins. After the resins have removed the cations from the juice or sugar solution the latter becomes acid in character. The acid solution is then allowed to flow or pass through another but different column of resins which will remove the anions forming a neutral solution.

To specifically illustrate the present invention wherein sucrose, or sucrose and a monosaccharide sugar or dextrose may be produced and made in a liquid, solid or powdered or crystalline state from colored sugar bearing fluids by the using of a new and novel chemical and ion exchange process reference is made to the following example which is specifically for use with sugar cane juice:

Approximately 800 gallons of sugar cane juice made by expressing the juice from the sugar cane is pumped into a 1000 gallon stainless steel tank. A wooden or glass lined tank may be used if so desired, but do not use ordinary iron tank. The Brix of the juice is adjusted so that it ranges from 3 to 20. The juice may be concentrated at this point to 70° Brix if so desired, but it has been observed that aqueous solution from 10 to 20 Brix work best.

At this stage any alkaloidal and protein precipitant may be added. By this is meant a reagent which will remove proteins, gums, bitter glucosides, certain colloidal coloring matter, certain organic acids, etc. from the fluid which is being processed.

A few protein and alkaloidal reagents or precipitants may be cited such as ferrocyanic acid, sulfosalicyclic acid, dinitrosalicyclic acid, trichloroacetic acid, phosphomolybdic acid, tannic acid, basic aluminium acetate, aluminium acetate and water soluble sodium silicate, basic chromite, basic lead acetate, calcium hydroxide or lime, strontium hydroxide, barium hydroxide, calcium, strontium and barium carbonate etc.

In accordance with this invention the precipitation of proteins, gums, glucosides, colloidal matter, organic acids etc. from any colored sugar bearing fluid or juice may be accomplished by the addition of one or more of the above protein and alkaloidal precipitants through a pH range of 3.0 to 11.0. For sucrose bearing fluids a pH range of 7.5 to 9.5 and below a pH of 11.0 is to be preferred. For dextrose an acid precipitant in a pH range below 7.0 is preferred. Alkalies such as lime and barium tend to precipitate dextrose in strong alkaline mediums.

Sugar cane juice will be used for illustration purposes for sucrose bearing fluids. Basic aluminium acetate and sodium silicate will be used to illustrate the protein precipitant.

In accordance with this invention basic aluminium acetate is added to sugar cane juice at levels from 0.001 to 0.5 per cent and not to exceed 2.0 per cent, or until no more precipitate forms upon its addition to a sample of filtered juice taken from the treatment tank at 32 to 212° F. In order to prevent hydrolysis of the sucrose as low a temperature as possible is desirable, especially when crystalline sucrose is desired. A temperature of 160 to 212 works best.

Precipitation is continued by altering the pH of the juice by the addition of a soluble silicate such as sodium or potassium, or by the addition of calcium, strontium or barium hydroxide until a preferred pH of 7.5 to 9.5 and below a pH of 11.0 is reached. At this point the colloidal nature of the protein has been destroyed and a precipitate forms. When no more precipitate forms upon addition of sodium silicate, this treatment is stopped. Under no condition should the pH exceed 11.0. At pH of 8.0 or better a greater portion of the iron, aluminum and magnesium are precipitated as insoluble hydroxides. Also some of the coloring matter is adsorbed in the precipitation of the gums, proteins and the like. The precipitate formed may be separated from the aqueous sugar solution by filtration through a filter press, using duck cloth and filter paper with the use of filter aid in the regular and customary manner. Centrifuging, decanting, or leaf type filter may be used as an alternate if desired. In the event the sugar bearing fluid contains no gums or protein this step may be eliminated.

If the event the sugar cane juice contains the equivalent of 0.5 per cent or more of mineral salts for each 20 degrees Brix they should be removed, or reduced below 0.2 per cent at this point by chemical treatment. Those remaining cations or mineral elements are calcium, potassium, sodium, barium and strontium. Calcium, barium and strontium can be removed down to spectroscopic quantities while less than one half of sodium and potassium cations are removed. For this any defecating material acidic in character which will form insoluble compounds with the above cations, or exchange hydrogen for these cations may be used. A few of the defecating reagents or precipitants are oxalic acid, fluosilicic acid, carbon dioxide gas, sulphur dioxide gas, ortho, meta and pyro phosphoric acid, super and triple phosphate, sulphonated coal, sulphonated naphthalene, phenol-formaldehyde resins, formaldehyde-tannin resins. As sucrose in sugar cane juice hydrolyzes in acid medium at high temperatures it is advisable to use a material with low hydrolytic properties. For illustration purposes oxalic acid and phosphoric acid will be used at preferred levels from 0.01 to 2.0 percent and not to exceed 5.0 per cent at 32 to 200° F. The preferred temperature being from 32 to 140° F. These reagents or precipitants should be added until no more precipitate forms, but never below pH of 2.5. The oxalic acid will remove calcium, barium and strontium and some of the potassium and sodium cations. The phosphoric acid will remove any aluminium not precipitated as aluminium hydroxide as well as excessive amounts of iron left in solution. Filter or centrifuge or both.

At this point the pH of the juice is adjusted from a pH of 2.5 to 5.0 and not to exceed 7.0 by use of alkali carbonates or hydroxides. For illustration purposes barium carbonate and barium hydroxide will be used. Although barium carbonate is only slightly soluble in water it reacts with acid ions in acid solution to remove oxalic acid, sulphates and excess phosphates as insoluble compounds. After precipitate settles, decant, filter or centrifuge or both.

In place of the alkali carbonates and hydroxides for removing di, trivalent anions any basic and alkaline material which forms insoluble compounds with anions may be used. A few additional materials and compounds which may be used are insoluble aromatic amines, ammoniated coal, amino anthraquinone, anion exchange resins etc. The levels range from 0.01 to 2.0 per cent at temperature from 32 to 212° F., 100 to 160° F. best suited.

After the anions above have been removed in the operation the sugar cane juice is run through a preheater at a temperature of 160–212° F. and pumped into columns of activated charcoal. In so much as the juice has been adjusted to a pH of 5.0 to 7.0 maximum adsorption of coloring matter takes place rapidly. In this operation the carbon columns are so arranged that the juice may be recirculated until all the coloring matter is removed. Further, the activated charcoal may be regenerated whenever it loses its adsorption properties by treating with acid in same manner as is customary to treat ion exchange resins. A two per cent hydrochloric or sulphuric solution is usually satisfactory, as it dissolves the adsorbed materials from the carbon, leaving the carbon in a regenerated and active condition again. All of the acid should be removed from the carbon by washing with soft water containing less than 5 grains of salt per gallon before using. By this arrangement and treatment the bone char "life" may be increased many folds.

From the carbon and bone char columns the juice is pumped into an ion exchange column in which hydrogen ions of the resin are exchanged for cations remaining in the sugar cane juice. The resin in the exchange column has been previously prepared so that the pH of the outgoing solution is approximately a pH of 1.5–2.0. A pH of 1.5 is preferred, a temperature of 32–140° F. is best range. The rate of the flow of the juice is so adjusted that the pH of the effluent solution will remain constant for 30 minutes to several hours. When the outgoing sugar cane juice or effluent solution reaches a pH of 3.0 to 4.5 the flow is stopped as the resins are unable to remove cations efficiently. The column is then pressed out. They may be regenerated with dilute acid solution (two to five per cent) in conventional manner. For regenerating the resins the column is filled with water and allowed to stand from 30 minutes to 1 hour to remove traces of sugar solution. The resins are then treated with a 2–5 per cent sulphuric acid solution to dissolve cations which have been removed from the sugar fluid. The hydrogen of the acid replacing the metallic elements of the resin. The acid solution is then removed and the resins washed with water free from salts to remove excess acid. The resin column is then ready to be used again. Special caution should be observed in not having the Brix too high as the flow is retarded and the resins degenerate very quickly. A Brix of 10–20 degrees is to be preferred although as high as 35–60 degrees Brix tested has proven that it worked fairly well although the resins degenerated much faster.

From the catex resin exchange the juice is pumped into a column of resins so previously treated so that the outgoing or effluent fluid will have a pH of 8.5 to 11.0. A pH of 9.5 is preferred. Again the flow of the juice is adjusted so that the pH of the outgoing or effluent solution is constant for 30 minutes or for several hours. The flow of the juice is continued until the effluent solution reaches a pH of 5.2 and then stopped. The anions resins will remove the excessive amounts of chloride anions which were not removed by chemical treatment as the chlorides of reagent previously used were soluble. Also any remaining carbonate anions or those from reagents introduced. The resins may be regenerated by dilute solutions (2–5 per cent) of alkali such as sodium hydroxide, ammonia, soda ash etc. in customary manner.

The juice from the anion exchange resins are then pumped into a mixing chamber where the pH is adjusted to a range from 5.2 to 7.5. A pH of 6.0 to 6.5 is preferred. From here it is sent to the bone char columns which have been previously washed with hot water to remove any salt which are soluble therefrom. The bone char removes any remaining coloring matter, bitter principles, reagents left in the juice. The best temperature is from 160 to 212° F.

From here the juice is sent to multiple effect evaporators, or vacuum pan where it is concentrated to 25 to 32 degrees Beaumé in the presence of a reducing agent such as activated charcoal. It is then refiltered with duck cloth, filter paper and filter aid and sent to vacuum pan to be concentrated to 59 to 90 degrees Brix or 32 to 47 degrees Beaumé if liquid sugar is desired. The water white liquid sugar may be dehydrated further by vacuum, spray or drum drying methods into crystalline and powdered sugar comprising glucose, sucrose and levulose, or the sucrose crystals may be separated from liquid sugar by centrifugals in usual manner. The crystalline or powdered sugar obtained above comprising sucrose, dextrose and levulose contains the riboflavin, biotin, vitamin $B_1$ niacin, choline, pantothenic acid, vitamin $B_{12}$, pyridoxin, ascorbic acid, vitamin K and vitamin E. Heretofore these have been destroyed or left in the final molasses. It also contains valuable trace elements of copper, iron, phosphorus, zinc sodium, potassium and calcium in an amount from 10 micrograms to 2.5 grams per 100 grams of liquid sugar.

If one desires sucrose in the crystalline state, the temperatures are controlled as low as possible to prevent hydrolysis and upon concentration of the water white sugar solution, sucrose will crystallize out and separate from water white liquid by centrifuging. In this instant the remaining liquid will contain some (5–35%) sucrose, and a large amount of glucose and levulose. Here again no molasses is left as an undesirable and wasteful by-product. Instead, liquid sugar is formed which will find wide applications for human use and industrial purposes.

As an illustration of the present invention for producing sucrose, sucrose and a monosaccharide sugar or liquid sugar from colored unrefined raw sugar containing small amounts of molasses by a new and novel process, the following is cited:

Brown unrefined raw sucrose is dissolved in water so that the Brix range from 3.0 to 20 degrees and not over 70 Brix.

The impurities and the undesirable molasses constituents in the above solution of brown unrefined raw sucrose may be removed from the sugar solution by the methods disclosed in my applications, Serial No. 705,805 or Serial No. 769,004 or by the methods disclosed in this application for processing sugar cane juice. However, in so much as brown unrefined raw sucrose has a purity of about 94 per cent, a shorter and more adoptable method will also be proposed, namely, precipitation of undesirable molasses impurities such as mineral salts, gums, protein, coloring matter, colloidal matter, etc by precipitation of same with an alkaloidal and protein precipitant and passing the deproteinated and degummed sugar solution through the carbon and bone char columns, then through ion exchange, concentrate water white liquid containing the sugar and obtain crystalline sucrose or liquid sugar depending on amount of hydrolysis of the sucrose.

Any of the forementioned alkoidal and protein precipitants may be used. For illustration purposes aluminum acetate (basic) and sodium silicate will be employed in exactly the same manner as it was in the treatment of sugar cane juice, that is, precipitation of protein, gums and organic matter will be conducted through a pH range of 4.5 to 11.0, the most desirable range being from 7.5 to 9.5. The gelatinous aluminum hydroxide and sodium silico aluminate which is formed will adsorb, precipitate and envelope the organic matter, protein, gums and cations, coloring matter and remove them from the field of action. After filtration or centrifuging, the sugar solution is adjusted to a pH of 4.8 to 5.5 by any of the acid defecating compounds heretofore mentioned. For this purpose meta phosphoric acid will be used. The sucrose solution is then pumped into preheater and heated to 160–212° F. and then passed into carbon columns. The remaining operation and steps are identical with that of the sugar cane juice. Upon concentration of the water white sucrose solution, crystalline sucrose will separate. The remaining liquid contains sucrose and a monosaccharide sugar. It is of sufficient high quality to be used as liquid sugar. If one desires it may be made into a powder by spray or drum drying or dehydrating in other ways. Here again the entire resultant product may be liquid sugar if so desired by hydrolyzing the sucrose to a larger extent, or one may have crystalline sucrose and liquid sugar or the entire finished concentrated liquid containing the sugar may be dehydrated and converted into a snow white powdered sugar composition comprising sucrose and a monosaccharide sugar and from ten micrograms to 7 grams of non sugar solids per 100 grams of sugar.

Sugar beet juices may be treated in the same manner as sugar cane juices. Heretofore, corn syrup made by processes now in use contained as much as 40 per cent of dextrin which has little sweetening properties. It also contained a high percentage of maltose sugar which is only one third as sweet as sucrose. Furthermore, corn syrup does not contain water soluble vitamins, levulose, valuable trace elements such as copper, manganese iodine, phosphorus and the like. It does contain undesirable carbonates, chlorides, sulphate ions as well as excessive amounts of sodium. This invention contemplates treating dextrose solutions made by the hydrolysis of starch and starch products in a manner similar to other sugar bearing fluids, that is to say, any undesirable or excessive amounts of gum, proteins, dextrins etc. will be removed by a protein and alkeidal precipitant. The coloring will be removed by activated charcoal or bone char or both used. The undesirable cations and anions such as chlorides, sulphates, sodium potassium etc. will be removed by ion exchange or reduced to minute quantities to overcome the undesirable effect. This invention further contemplates that those sugars not present in commercial corn syrup be introduced, for example, sucrose or levulose or both. The amount not to exceed 50 per cent. 25 per cent is preferred. This invention also contemplates the enrichment of regular commercial corn syrup with water soluble vitamins and trace elements. Finally this invention contemplates that corn syrup made by this process shall not contain more than 7 per cent nonsugar solids and that the water soluble vitamins and trace elements of zinc, iron, copper, manganese, iodine or phosphorus be introduced from 10 micrograms to 7 grams per 100 grams of syrup, of which not more than 2.5 per cent nor less than 10 micrograms is trace elements.

Water white liquid sugars and syrups made in accordance with this invention are new, novel and desirable sweetening materials. The products have increased sugar tolerance with reduced fattening qualities. The trace elements such as manganese, copper, iron, zinc, iodine and phosphorus, together with the water soluble vitamins such as vitamin $B_1$ or thiamin, vitamin $B_{12}$, pantothenic acid, biotin, riboflavin, pyridoxin or vitamin $B_6$ aid in cell oxidation and minimize the fattening effects of the sugar, and permit wider sugar tolerance and therefore, have wider applications. Levulose is recognized by medical profession as having high sugar tolerance and low fattening qualities. The process herein disclosed is more efficient, less costly, and permits greater yields of total sugars, sucrose, or dextrose, or mixed sugars such as sucrose, dextrose and levulose, or dextrose and maltose. There is no molasses formed in the operation. The liquid sugar or syrup is sweeter than ordinary corn syrup and is superior in nutritional and food values. Levulose in liquid sugar is approximately three times as sweet as dextrose.

In order to utilize the above discovery, this invention contemplates water soluble vitamins such as the B vitamins which include thiamin or vitamin $B_1$, riboflavin, niacin, biotin, choline, folic acid, vitamin $B_6$, pantothenic acid, vitamin $B_{12}$, and the water soluble vitamins ascorbic acid and eriodictyol be mixed with powdered or crystalline mono and di saccharide sugars, sucrose and a monosaccharide sugar, sucrose alone, dextrose alone, sucrose and levulose, or sucrose, dextrose and levulose, or any edible sugar. The best level ranging from 10 micrograms to 7 grams per 100 grams of sugar. This invention further contemplates that the desirable trace elements be added; for example, copper at a level from 0.1 to 20 parts per million, iodine from 0.1 to 100 parts per million, iron from 0.1 to 200 parts per million, manganese from 0.1 to 50 parts per million, calcium from 0.1 microgram to 0.88 milligram per 100 grams sugar and phosphorus from one microgram to 132 milligrams per 100 grams of sugar and zinc from 0.1 to 50 parts per million, potassium and sodium present in amount from .001 to 5 parts per thousand. These elements shall range from 10 micrograms to 2.5 grams per 100 grams of sugar or syrup.

The above sugar compositions are superior to ordinary sugar of commerce in nutritional and food properties, with greater sugar tolerance, with reduced fattening qualities. The mixed sugars comprising sucrose and levulose have superior and improved sweetening properties over sucrose alone or dextrose alone.

The above compositions contain substances usually found deficient in foods and individuals suffering from nutritional ailments. They aid in speeding up basal metabolism and in burning up sugars. They also aid in bodily oxidation and assimilation of sugars.

Liquid sugar, or powdered and crystalline mixed sugars of dextrose and fructose, or fruit concentrates may be made from citrus fruit juices by foregoing processes herein cited. The undesirable gums, glucosides, etc., removed by a protein and alkaloidal precipitant, undesirable organic acids such as citric removed in part by alkaline earth hydroxides, or carbonates, excess anions and cations removed by ion exchange, and sugar solution concentrated to 59 to 90 degrees Brix. When made from orange juice the concentrate is rich in ascorbic acid and carotene, which is colored. If water white liquid sugar is desired, the citrus fruit juices are passed through activated charcoal and bone char columns prior to ion exchange treatment.

While in the foregoing description a number of illustrations and examples have been given, it will be understood that the present invention is not limited in its application to the specific applications of the sugars cited. This invention primarily contemplates the production of crystalline or powdered sugars or water white liquid sugar or syrup from colored sugar bearing fluids by the employment of chemical treatment to remove the gums, proteins, glucosides, dextrins and the divalent and trivalent cations and anions, and ion exchange to remove potassium and sodium cations and chloride anions left in solution, together with traces of undesirable reagents remaining in the solution, and subsequent concentration thereof to the desired Brix or Beaumé. It is to be understood that the use of such individual features as do depart from the spirit of this invention are, although not specifically described herein, contemplated by, and within the scope of the appended claims.

Having described my invention, what is claimed:

1. A sugar composition of matter having superior and improved sweetening and nutritional properties, with reduced fattening qualities, and greater sugar tolerance adaptable as a sweetening material for human use, beverages, food products and other commercial uses comprising mono and di saccharide sugars in a powdered and crystalline state and a water soluble vitamin, and from 10 micrograms to 2.5 grams of desirable trace elements per 100 grams of sugar.

2. A sugar composition of matter having superior and improved food and nutritional properties, with reduced fattening qualities, and greater sugar tolerance adaptable as a sweetening material for human consumption, beverages, food products and other commercial uses comprising a di saccharide sugar in a powdered and crystalline state and a water soluble vitamin, and containing from 10 micrograms to 7 grams of said vitamin and trace elements per 100 grams of sugar.

3. A sugar composition of matter having superior and improved food and nutritional properties, with reduced fattening qualities and greater sugar tolerance adaptable as a sweetening material for beverages, food products, human use and other commercial uses comprising a monosaccharide sugar in a powdered and crystalline state and a water soluble vitamin, and containing not more than 7 grams of said vitamin, trace elements and other desirable nonsugar solids per 100 grams of sugar.

4. A sugar composition of matter having superior and improved nutritional properties, with reduced fattening qualities and greater sugar tolerance adaptable for table use, beverages, food products and other commercial uses comprising sucrose in a powdered and crystalline state and a water soluble vitamin, and from 10 micrograms to 7 grams of trace elements and other desirable nonsugar solids per 100 grams of sugar.

5. A solid sucrose sugar composition of matter in a crystalline and powdered state having superior and improved nutritional properties, with reduced fattening qualities and greater sugar tolerance adaptable for human consumption, food products, beverages and other commercial uses comprising sucrose and water soluble vitamin $B_1$, and containing from 10 micrograms to 7 grams of phosphorus, iodine and other nonsugar solids per 100 grams of the composition.

6. A solid sugar composition of matter in a crystalline and powdered state having superior and improved sweetening properties, with reduced fattening qualities and greater sugar tolerance adaptable as a sweetening material for table use, beverages, food products, and other commercial uses comprising sucrose, dextrose, levulose, and a water soluble vitamin, and containing from 10 micrograms to 7 grams of trace elements of copper, iron, manganese, phosphorus, cobalt, iodine, potassium, sodium and other desirable nonsugar solids per 100 grams of the composition.

7. A liquid composition of matter having superior sweetening and nutritional properties, with reduced fattening qualities and greater sugar tolerance adaptable for table use, beverages, food products and other commercial purposes comprising sucrose, dextrose and levulose, concentrated to a Brix from 59 to 90 degrees, together with vitamin $B_1$, riboflavin and pyridoxin, and containing not more than 7 grams of trace elements and other desirable nonsugar solids per 100 grams of liquid composition.

8. A liquid composition of matter having superior sweetening and improved nutritional properties, with reduced fattening qualities and greater sugar tolerance adaptable as a sweetening material for human consumption, food products, soft drinks and other uses comprising mono and di saccharide sugars in a liquid state concentrated to a Brix of 59 to 90 degrees and a water soluble vitamin, and from 10 micrograms to 7.0 grams of trace elements per 100 grams of liquid composition.

9. A liquid composition of matter having superior sweetening and improved nutritional properties, with reduced fattening qualities and greater sugar tolerance adaptable for table use, soft drinks, confectioneries, food products and other commercial uses comprising sucrose, together with other mono and di saccharide sugars concentrated to a Brix of 59 to 90 degrees and a water soluble vitamin, and containing from 10 micrograms to 7 grams of nonsugar solids of which not more than 2.5 grams are desirable trace elements per 100 grams of liquid sugar composition.

10. A water white liquid composition of matter adaptable as a sweetening material for human use, food products, beverages, confectioneries and other commercial uses comprising sucrose, together with other mono and di saccharide sugars concentrated in a liquid state to 59 to 90 degrees Brix, and containing from 10 micrograms to 7 grams of biotin, pyridoxin, vitamin $B_1$, inositol, pantothenic acid, trace elements of phosphorus, iodine, manganese, cobalt, sodium, and potassium an other desirable nonsugar solids per 100 grams of liquid composition.

11. A method for producing white sucrose from colored sugar cane juice having a Brix of from 3° to 20° without molasses as a by-product and in one continuous operation which comprises treating the juice with an alkaloidal and protein precipitant at 32 to 212° F. until a preferred pH of 7.5 to 9.5, and below a pH of 11.0 is reached to coagulate, neutralize and precipitate, gums, organic acids, colloidal matter, glucosides, proteins, and to partially remove iron, magnesium and aluminium as insoluble hydroxides; separating; removal of calcium and other di and tri valent cations as insoluble compounds by treating the juice with an acid defecating compound at a preferred pH of 32 to 140° F. and not to exceed 200° F. until a pH of 2.5 is reached; adjusting of the pH of the juice from 2.5 to a pH of 5.0 and not to exceed 7.0 with a basic and alkaline producing compound, and to partially remove sulphates, carbonates and phosphates as insoluble compounds; separating; removal of all coloring matter with activated charcoal at 160° to 212° F. at pH of 5.0 to 7.0; removal of potassium and sodium cations together with traces of reagents introduced by a cation exchanger, removal of chloride anions and traces of anions introduced by reagents with anion exchanger, removal of remaining bitter and toxic principles together with any acquired coloring matter with bone char treatment, and concentrating the aqueous water white sugar solution by vacuum and dehydration methods into white crystalline sucrose and liquid sugar.

12. A method of producing more sucrose and more total sugars having superior sweetening and improved nutritional properties, with reduced fattening qualities and greater sugar tolerance from sugar cane juice having a Brix of from 3° to 20° without molasses formation and in one continuous operation which comprises treating the juice with an alkaloidal and protein precipitant at 32 to 212° F. until a pH of 7.5 to 9.5 and not to exceed a pH of 11.0 is reached to coagulate, neutralize and precipitate gums, organic acids, colloidal matter, glucosides, proteins, and to partially remove iron, magnesium and aluminium as insoluble hydroxides; removal of all coloring matter with activated charcoal, removal of excessive amounts of calcium, potassium, sodium and other cations introduced by reagents with a cation exchanger, removal of chlorides together with other anions introduced by reagents with an anion exchanger, removal of remaining bitter principles and coloring matter acquired from ion exchange treatment with bone char, and concentrating the water white aqueous sugar solution by vacuum and dehydration methods into a crystalline and powdered sugar comprising sucrose, dextrose and levulose, and containing from 10 micrograms to 7 grams of water soluble B vitamins, ascorbic acid, trace elements, and other desirable nonsugar solids per 100 grams of crystalline and powdered sugar.

13. A new method for refining and producing more white sucrose from raw brown sugar without molasses as a by-product which comprises treating an aqueous solution of raw sugar having a Brix from 3 to 70 degrees with 0.001 to .5 per cent, and not to exceed 2 per cent of basic aluminium acetate and water soluble sodium silicate until a pH of 7.5 to 9.5, and not to exceed a pH of 11.0 is reached to coagulate, neutralize and precipitate gums, organic acids, colloidal matter, proteins, and to partially remove iron, magnesium and aluminium as insoluble hydroxides; filtering and centrifuging, adjusting of pH to 4.8 to 5.5 with phosphoric acid and remove all coloring matter with activated charcoal at 160–212° F., removal of remaining excessive amounts of cations and anions and reagents with ion exchange treatment, removal of bitter principles and any acquired coloring matter with bone char, filtering and concentrating the aqueous water white sugar solution by vacuum and dehydration methods into crystalline white sucrose and liquid sugar.

14. A process for producing water white liquid sugar from colored sugar bearing fluids which comprises treating an aqueous sugar solution with an alkaloidal and protein precipitant to remove gums, organic acids, colloidal matter, proteins and glucosides; removal of coloring matter with activated charcoal; removal of excess cation and anions and reagents introduced by ion exchange treatment, removal of remaining bitter principles and any coloring matter acquired by bone char, and concentrating the aqueous water white sugar solution by vacuum methods into liquid sugar having a Brix from 59 to 90 degrees.

15. A process for producing water white liquid sugar from a colored sucrose bearing fluid in one continuous operation which comprises treating the sucrose solution having a Brix from 3 to 70 degrees with an alkaloidal and protein precipitant at 32 to 212° F. until a pH of 7.5 to 9.5, and not to exceed 11.0 is reached to coagulate, neutralize and precipitate gums, organic acids, colloidal matter, proteins, and to partially remove iron, magnesium and aluminium as insoluble hydroxides; separating; removal of calcium, barium, strontium and other di and tri valent cations by treating the sucrose solution with an acid defecating compound to form insoluble compounds at 32 to 200° F. until acid and not below a pH of 2.5; separating; removal of sulphates, carbonates and phosphates as insoluble compounds by a basic and alkaline producing compound and material at 100 to 212° F. in pH range from 2.5 to 7.0; separating; removal of all coloring matter with activated charcoal at 160–212° F. at pH of 5.0 to 7.0; removal of potassium, sodium cations, chloride anions and trace of reagents introduced by ion exchange treatment, removal of remaining bitter principles and any acquired coloring matter with bone char, and concentrating aqueous water white sugar solution in vacuo into liquid sugar having a Brix of 59 to 90 degrees, and containing from 10 micrograms to 7.0 grams of water soluble vitamins, trace elements, and other desirable nonsugar solids per 100 grams of liquid sugar.

16. A process for producing liquid sugar from sugar cane juice having a Brix of from 3° to 20° which comprises treating the juice with an alkaloidal and protein precipitant to remove gums, colloidal matter, organic acids and proteins, removal of coloring matter with activated charcoal, removal of cations and anions with ion exchange treatment, removal of remaining bitter principles and reagents introduced with bone char, and concentrating the aqueous sugar solution into a liquid sugar comprising sucrose, dextrose and levulose, and containing from 10 micrograms to 7.0 of water soluble B vitamins, vitamin K, vitamin E, ascorbic acid, trace elements and other desirable nonsugar solids per 100 grams of liquid sugar.

17. The process for producing liquid sugar from sugar cane juice in one continuous operation and without molasses as a by-product which comprises treating the juice with an alkaloidal and protein precipitant at 32 to 212° F. until a pH of 7.5 to 9.5, and below 11.0 is reached to precipitate, coagulate and neutralize proteins, colloidal matter, organic acids, gums, and to partially remove iron, magnesium and aluminium as insoluble hydroxides; centrifuging and filtering; treating the juice with an acid defecating compound and material at 32 to 200° F. until the juice is acid and not below a pH of 2.5 to precipitate calcium and other di and tri valent cations; filtering, removal of sulphates, carbonates and other di and trivalent anions by treating the juice with a basic and alkaline producing compound at 100 to 212° F. until a pH of 5.0 to 7.0 is reached to precipitate said anions as insoluble compounds; centrifuging and filtering; removal of coloring matter with activated charcoal at 160 to 212° F.; removal of potassium and sodium cations and chloride anions together with trace of reagents introduced by ion exchange treatment, removal of remaining bitter principles and any acquired coloring matter with bone char, and concentration of aqueous juice by vacuum and dehydration method into liquid sugar having a Brix of 59 to 90 degrees, and containing from 10 micrograms to 7.0 of desirable nonsugar solids of which not more than 2.5 grams are trace elements of copper, iron, manganese, phosphorus, together with traces of other elements per 100 grams of liquid sugar.

18. The process for producing liquid sugar from sugar cane juice which comprises treating the juice at 32–212° F. with 0.001 to 0.5 per cent, and not to exceed 2.0 per cent of basic aluminium acetate and sodium silicate until a preferred pH of 7.5 to 9.5 is reached to precipitate, coagulate and neutralize gums, colloidal matter, organic acid, proteins, and to remove iron, magnesium and aluminium as insoluble hydroxides; separating; removal of calcium and other di and tri valent cations with 0.01 to 2.0 per cent, and not to exceed 5.0 per cent of phosphoric acid and oxalic acid at 32 to 200° F.; filtering, removal of sulphate and other di and tri valent anions, together with oxalates and phosphates introduced by treating the juice with 0.01 to 2.0 per cent of barium carbonate and barium hydroxide until a preferred pH of 4.8 to 5.5, and not to exceed 7.0 is reached to remove said anions as insoluble compounds at 32 to 212° F.; separating; removal of potassium and sodium cations and chloride anions together with traces of reagents introduced with ion exchange treatment; removal of coloring matter with activated charcoal and bone char at 160 to 212° F. in pH range of 4.8 to 7.0, filtering and concentrating the aqueous juice into a liquid sugar comprising sucrose, dextrose and levulose having a Brix from 59 to 90 degrees, and containing biotin, vitamin $B_1$, riboflavin, pyridoxin, niacin, pantothenic acid, ascorbic acid, vitamin $B_{12}$, vitamin K, vitamin E and trace elements and other desirable nonsugar solids in amounts from 10 micrograms to 7.0 grams per 100 grams of liquid sugar.

19. A sugar composition of matter having superior food and nutritional properties with reduced fattening qualities, and greater sugar tolerance adaptable as a sweetening material for human consumption, food products, jellies, soft drinks, confectioneries, beverages and other commercial uses, comprising mono and di saccharide sugars in a powdered and crystalline state, a water soluble vitamin and from 10 micrograms to 7 grams of a trace element per 100 grams of sugar composition.

20. A process for producing liquid sugar from colored sucrose bearing fluids which comprises treating an aqueous sugar solution with an alkaloidal and protein precipitant to remove gums, organic acids, colloidal matter, proteins and glucosides; removal of coloring matter with activated charcoal; removal of excess cation and anions and reagents introduced by ion exchange treatment, removal of remaining bitter principles and any coloring matter acquired by bone char, and concentrating the aqueous water white sugar solution by vacuum methods into liquid sugar having a Brix from 59° to 90° and containing from 10 micrograms to 7.0 grams of water soluble vitamins and trace elements per 100 grams of liquid sugar.

21. A process for producing sugar in powdered and crystalline form from colored sugar bearing fluids in one continuous operation and without producing molasses as a by-product, which comprises treating an aqueous sugar solution with an alkaloidal and protein precipitant to remove gums, organic acids, colloidal matter, proteins and glucosides; removal of coloring matter with activated charcoal; removal of excess cation and anions and reagents introduced by ion exchange treatment, removal of remaining bitter principles and any coloring matter acquired by bone char, and concentrating the aqueous water white sugar solution by vacuum methods into powdered and crystalline sugar.

22. A process for producing sucrose in solid form sucrose bearing fluids and juices in one continuous operation and without molasses as a by-product which comprises treating an aqueous sucrose solution having a Brix from 3° to 70° with an alkaloidal and protein precipitant at 32° F. to 212° F. through a pH range from 3.0 to 7.5 and not to exceed 11 to remove gums, organic acids, colloidal matter, proteins and glucosides; partial removal of cations with acid precipitant; adjusting of sugar solution to a preferred pH of 5.0 and removing of coloring matter with activated charcoal at 160° F. to 212° F.; removal of excess anions, cations, and reagents introduced by ion exchange treatment; removal of bitter principles and acquired coloring matter with bone char, and concentrating the aqueous sugar solution into crystalline and powdered sugar comprising sucrose and containing from 10 micrograms to 7.0 grams of water soluble vitamins and trace elements per 100 grams of sugar composition.

23. In the art of sugar manufacture, the process for producing white sucrose from a colored sucrose bearing fluid in one continuous operation and without molasses as a by-product which comprises treating the aqueous sucrose solution having a preferred Brix from 3° to 20° and not exceeding 70° with an alkaloidal and protein precipitant at 32° to 212° F. until a preferred pH of 7.5 to 9.5 and below a pH of 11 is reached for the removal of gums, colloidal matter, glucosides, proteins and partial removal of iron, magnesium and aluminum as insoluble hydroxides; separating; removal of calcium and traces of aluminum together with other di and tri valent cations by treating the aqueous sucrose solution with an acid defecating compound at preferred temperature of 32° to 140° F. and not over 200° F. until a pH of 2.6 is reached; separating; adjusting of pH from 2.5 to 5.0 and not to exceed 7.0 and partial removal of sulphate, carbonate and phosphate anions and traces of reagents by treating the solution with a basic and alkaline producing compound at a preferred temperature of 100 to 160° F. and not to exceed 212° F.; separating; removal of coloring matter with activated charcoal at 160° to 212° F. at pH of 5.0 to 7.0, removal of excess potassium and sodium cations by passing the sucrose solution through a column of resins whereby cations are exchanged for hydrogens at 32° F. to 140° F., removal of excess chloride anions and traces of anions introduced by reagents by passing the sucrose solution through a different column of resins to remove the anions as insoluble compounds at 32° F. to 140° F., removal of remaining bitter and toxic principles and any coloring matter introduced by ion exchange with bone char treatment; filtering; concentration and dehydration of aqueous water white sucrose solution by vacuum and dehydration methods into white crystalline and powdered sucrose, together with small amounts of mono saccharide and other sugars, and containing from 10 micrograms to 7.0 grams of desirable nonsugar solids per 100 grams of sugar.

JOHN PAUL BARTZ.

REFERENCES CITED

The following references are of record in the file of this patent:

UNITED STATES PATENTS

| Number | Name | Date |
|---|---|---|
| 1,534,166 | Dahlberg | Apr. 21, 1925 |
| 1,606,010 | Takamine et al. | Nov. 23, 1926 |
| 2,395,907 | Peckham, Jr. | Mar. 5, 1946 |
| 2,408,418 | Erickson | Oct. 1, 1946 |

OTHER REFERENCES

"Apple Sirup by Ion Exchange Process," Industrial and Eng. Chemistry, vol. No. 7, July 1945, pages 635–639.